July 18, 1944.  J. L. WILLIAMSON  2,354,165
METHOD OF SHARPENING FLAT TOP GEAR SHAPING CUTTERS
Filed March 10, 1942
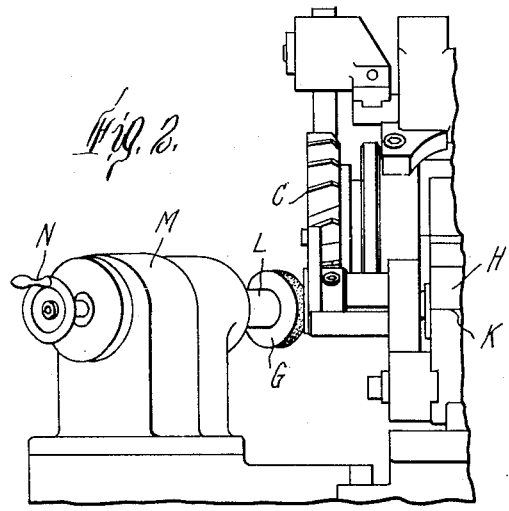
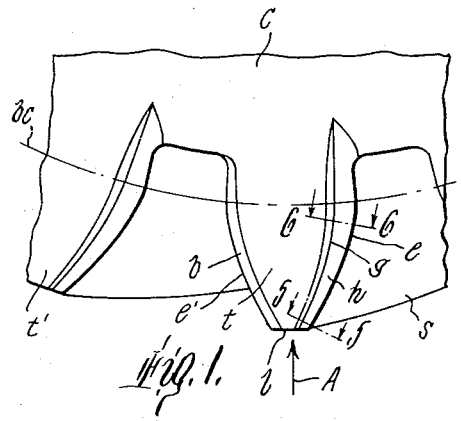
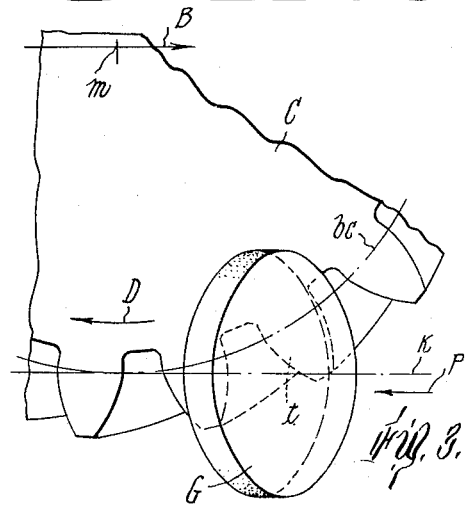
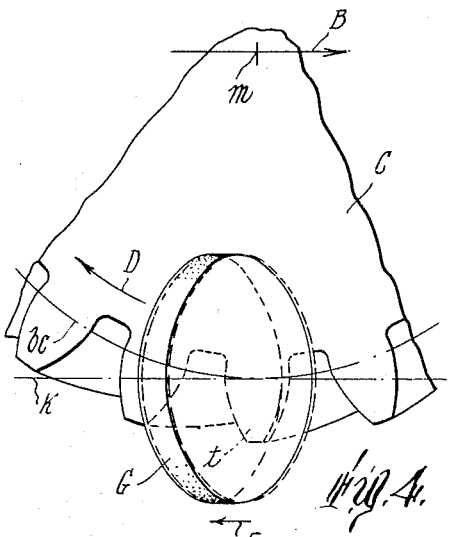
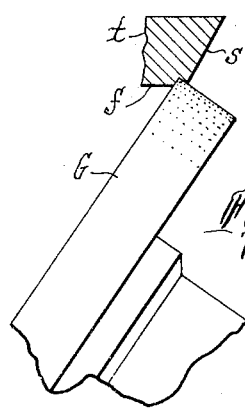
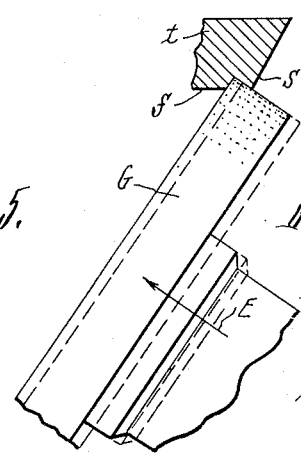
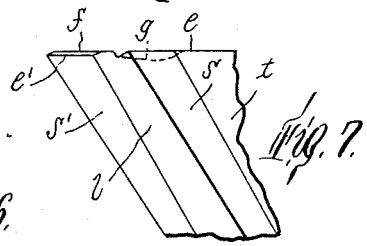
Inventor
James L. Williamson
by Wright, Brown, Quimby
 & Seay Attys.

Patented July 18, 1944

2,354,165

UNITED STATES PATENT OFFICE 2,354,165

METHOD OF SHARPENING FLAT TOP GEAR SHAPING CUTTERS

James L. Williamson, Springfield, Vt., assignor to The Fellows Gear Shaper Company, Springfield, Vt., a corporation of Vermont Application March 10, 1942, Serial No. 434,055

4 Claims. (Cl. 51—287)

The present invention relates to gear shaper cutters of the class called flat top cutters. Such cutters have teeth similar to gear teeth, with cutting edges lying substantially in a plane, or planes, perpendicular to the axis of the cutter, and with cutting clearance at the sides of the teeth from the cutting end toward the opposite end. They are of both helical and spur gear types. In order to form a sufficient top rake, in cases where the tooth side faces meet the end faces at an angle too large for the best cutting effect, grooves are cut in the flat end faces and are so fashioned that one side of the groove intersects the adjacent side face of the tooth at the desired angle of top rake. Such grooving is more especially necessary with helical cutters, whereof one side face of each tooth makes an obtuse angle with planes perpendicular to the axis, in order to produce an acute angle of top rake contiguous to the cutting edge at that side. Grooving to make a sharper angle of top rake is also performed contiguous to both sides of the teeth of spur type cutters in cases where the clearance angles between the side and end faces is not sufficiently acute. With helical cutters, the end face contiguous to the acute angle side is frequently beveled to make the angle at the cutting edge less acute than the helix angle; but that is a feature with which the present invention has no concern. Its sole concern is with the grooved or recessed side of the end faces of the teeth.

The object of the invention is to furnish a procedure and means for forming a top rake groove of the character described having greater width or clearance in the wider parts of the tooth than at the tip, or extremity, and which on occasion may be even wider than the land at the tip; and doing so in a manner which causes the contiguous cutting edge to lie in the desired plane. In cutting such grooves according to the best mode of procedure, the cutter is rolled on the base circle of its tooth curves past a grinding wheel, or other suitable sharpening tool, which is suitably located to perform a cutting action in a zone contiguous to the edge of the tooth. Or a like relative motion is otherwise produced between the cutter tooth and the sharpening tool. This action causes the groove produced to be of uniform width, in lines normal to the cutting edge, at points in the curve generated from the base circle. This width, however, may not exceed the width of the land at the tip or extremity of the tooth and, in cutters of which the teeth are narrow at the extremity, is not wide enough to give adequate clearance in the wider parts of the tooth. By the present invention I have perfected a method by which I am enabled to widen the groove, in any part of its length inward from the tooth extremity, progressively if desired, and to any extent necessary to obtain the desired clearance. This method is described in the following specification with reference to illustrative drawing, in which—

Fig. 1 is a face view of the cutting ends of two of the teeth of a helical flat top gear shaper cutter, in which grooves have been cut in accordance with the present invention;

Fig. 2 is a fragmentary end elevation of a cutter sharpening machine suitable for use in performing this invention.

Figs. 3 and 4 are diagrams illustrating the start and finish of the grooving or sharpening operation;

Figs. 5 and 6 are fragmentary sectional views of one of the cutter teeth, the sections being taken on lines 5—5 and 6—6, respectively, of Fig. 1, and they show also the relative positions of the grooving or sharpening tool at the beginning, and at a point near the end, respectively, of the grooving or sharpening action;

Fig. 7 is an elevation of one of the cutter teeth shown in Fig. 1, as seen from a view point on the median helicoid of the tooth looking toward the axis of the cutter.

Like reference characters designate the same parts wherever they occur in all the figures.

Fig. 1 shows at C a fragment of a flat top helical gear shaper cutter including a tooth $t$ and a portion of a second tooth $t'$, the cutting end of the cutter and its teeth being here presented to view. The tooth $t$ is also shown in Fig. 7 as viewed in the direction of the arrow A in Fig. 1. The end face $f$ of the cutter is in a plane perpendicular to the cutter axis and the side faces $s$ and $s'$ of each tooth intersect such plane at oblique angles which, in the case of the side $s$ is obtuse and in the case of the side $s'$ is acute. These side faces $s$ and $s'$ are involute helicoids generated from a base circle $bc$; with respectively different helix angles so related as to provide side clearance away from the end face $f$.

A groove $g$ is cut into the end face $f$, of which the bounding surface $h$ makes an acute angle with the tooth face $s$. The intersection of the surface $h$ with the side face $s$ forms the cutting edge $e$, which is an involute curve lying in a plane perpendicular to the axis of the cutter. Such plane may be that designated $f$ in Fig. 7, or a plane parallel to it. The acute angle inclination of the surface $h$ to the side face $s$ is the same in all planes normal to the cutting edge. It provides the top rake for that side of the tooth and may be made of any value desired. A top rake of less acuteness than the angle between the side face $s'$ and the end face $f$ may be provided at the other side of the tooth by a beveled surface $b$, the intersection of which with the face $s'$ makes a cutting edge $e'$, which lies in a plane perpendicular to the axis of the cutter closely adjacent to the plane $f$.

The new step accomplished by the present invention is to make the width of the top rake surface $h$ greater in the wider parts of the tooth than at the extremity, and as great as may be desired regardless of the limitations imposed by the width of such extremity. This is accomplished by advancing the tool by which the groove $g$ is cut, or enlarged, inwardly toward the middle of the tooth from the edge $e$ in the course of the cutting progress from the tip toward the root of the tooth, or vice versa. Preferably this effect is accomplished while maintaining that point of the grooving tool which crosses the side face $s$ continuously in the same plane perpendicular to the axis of the cutter, so that the edge $e$ will lie in that plane, whatever may be the width and depth of the groove or the variations thereof.

A suitable procedure for performing the step referred to is shown diagrammatically in Figs. 3 and 4. A grooving tool in the form of a grinding wheel G is shown here, and is additionally shown in Figs. 5 and 6. It is assumed that the axis $m$ of the cutter is moved in a straight line in the direction of the arrow B, while being rotated in the direction of the arrow D about the axis. If the rate of this angular rotation is such that the linear speed of the base circle $bc$ is equal to that of the axis $m$, then the resultant motion of the cutter is the same as though it were rolled on its base cylinder along a plane surface $k$. Assuming that the grinding wheel is a disk having a cylindrical periphery, and is mounted with its axis in the plane $k$ at an angle to the end face of the cutter equal to the prescribed angle of top rake, and is located to intersect the end plane of the cutter, and if the cutter is adjusted to bring a tooth $t$ into position to intersect the nearer edge of the grinding wheel on the plane $k$, then while the cutter rolls from the position of Fig. 3 to that of Fig. 4, the grinding wheel will cut a groove in the end face of the tooth $t$ which is an involute helicoid of the base circle $bc$ and intersects the side face $s$ of the cutter at an edge $e$, which is an involute of the same base circle and lies in a plane perpendicular to the cutter axis. The grooving action is shown in Fig. 3 as commencing at the tip of the tooth $t$, and in Fig. 4 as having nearly reached the base circle.

Increases in width and depth of the groove are accomplished by feeding the grinding wheel axially in the general direction of the arrow E in Fig. 6, while the previously described rolling motion is in progress. Such axial feed may be performed progressively at a regular rate, or intermittently with equal or unequal increments. However performed, the effect is to widen, and incidentally deepen, the groove at points away from the tip toward the root of the tooth, where greater clearance is needed and where greater width of the tooth permits such greater clearance to be established. This is additionally shown by Figs. 5 and 6, of which the former is a section near the tip of the tooth on a plane normal to the side face $s$, (approximately that indicated by line 5—5 of Fig. 1), and the grinding wheel is shown in approximately the relation it occupies to the cutter in Fig. 3. Fig. 6 shows the grinding wheel in approximately the relation to the cutter represented in Fig. 4, after having been fed from the dotted line position to the full line position in the direction indicated by arrow E; and shows a section of the tooth on line 6—6, which also is normal to the face $s$.

The direction of rolling may be reversed; the grinding wheel being fed to the full width and depth of the groove in the widest part of the tooth, the cutter being then rolled to shift the grinding action toward the tip of the tooth and the grinding wheel being withdrawn to make the groove narrower at and near the tip. In the usual practice, the cutter is rolled both ways, from tip to root and back; and the grinding wheel is fed inward in the course of the tip to root progress and outward while traversing from the root to the tip of the cutter tooth. The cutter is then indexed and the same procedure is repeated.

In the foregoing explanation it is assumed that the axis of the grinding wheel lies in the rolling plane $k$. This, however, is not a limiting condition and satisfactory results are obtainable when the grinding wheel axis is displaced in either direction from that plane, or inclined to it, within limits. The limits referred to are those within which the cutting elements of a grinding wheel, or equivalent tool, can be situated to cut a top rake of desired inclination and locate the edge of the cutter tooth in a plane perpendicular to the axis of the cutter, in consequence of a relative rolling displacement substantially as described.

The utility of this invention is most marked with cutters of which the teeth are so narrow at the tip as to preclude formation of a groove having adequate clearance by methods which form grooves of uniform width and depth throughout. But I desire to protect the principles of the invention for all purposes and in all circumstances wherein they may have utility.

The procedure above described may be performed with the aid of an apparatus such as disclosed in the patent to Edward W. Miller, No. 1,991,406, granted February 19, 1935, entitled Cutter sharpening machine. A fragment of that end of the machine which supports the cutter is shown in side elevation in Fig. 2, and the cutter C is shown as being mounted on the work spindle of the machine. Such spindle is carried by a slide H which rests and reciprocates on a plane supporting surface K corresponding to the rolling plane $k$ of the preceding description. At the same time the work spindle is rotated at a rate and in a direction which gives the effect of non-slip base circle rolling on a plane surface. The grinding wheel G is mounted on a spindle L rotatable in a bearing M, which is rotated by any suitable means. The structure for supporting the grinding wheel and its spindle may be provided with means such as a hand wheel N cooperating through a nut and screw mechanism, or other suitable means, with the grinder spindle L to move the latter and the grinding wheel axially, as previously described.

This method is not dependent on any specific apparatus and may be carried out in other ways than with the aid of the machine here shown for illustration. For instance, the relative rolling movement between the cutter and grooving tool may be effected by rotating the cutter about its axis $m$ in the direction of the arrow D, without linear displacement, and displacing the grooving tool at the same time in the direction of arrow P, at the same linear speed as the base circle of the cutter; and the same relative motion can be effected in other ways.

Also a grinding wheel of conical form at the periphery, instead of the cylindrical form here shown, may be used, provided the movement for altering the dimensions of the groove are effected in the direction of the surface element of the wheel which is substantially normal to the edge of the cutter tooth. However, the grooving tool may be other than a grinding wheel, provided it is capable of removing stock from the cutter teeth with the ultimate effect herein described.

The shape and contours of the other bounding wall of the groove, (that is, other than the surface $h$), are unimportant. It is a helicoid making a normal angle of 90° with the top rake surface $h$ when cut by a right cylindrical wheel, as here shown, but may be disposed at other angles by operation of conical and other wheels of which the forward end face in radial section makes other than a right angle with the peripheral surface.

The procedure here described is used in initially grooving cutters in the course of manufacture, and subsequently from time to time as needed to sharpen the edges after wear. After one tooth has been thus grooved or sharpened, and the cutter rolled clear of the grooving tool, the cutter is indexed to bring another tooth into the operating position and the operation repeated. Prior to each movement of rolling approach between the cutter and tool, the tool is withdrawn to limit the dimensions of the groove as required by the cutter tooth lands in the outside circumference; and during the progress of the grooving action, the tool is advanced through whatever distance may be needed to accomplish a predetermined enlargement of the groove.

Although the method of this invention has been described in detail only in respect to a helical cutter, it will be appreciated without detailed illustration that the procedure is the same with respect to spur type cutters when such cutters are grooved; the only difference being in the degree of the top rake angle, effected by suitable adjustment of the angle between the circumference of the grooving tool and planes perpendicular to the axis of the cutter.

What I claim and desire to secure by Letters Patent is:

1. The method of grooving or sharpening flat top gear shaper cutters with an angle of top rake smaller than the intersection between a side of the cutter tooth and the end face of such tooth lying in a plane perpendicular to the cutter axis, with a varying width of the top rake surface, which consists in effecting a relative rolling motion between such a cutter and a grooving tool such that a displacement between such tool and one edge of the end face of a tooth of the cutter takes place along such edge, maintaining a part of such tool in cutting action upon the said end face at and inward from the before mentioned edge thereof in a line normal to such edge, making the same angle with the contiguous side face in all planes normal to such edge, maintaining that part of the grooving tool which coincides with the side edge of the tooth constantly in the same plane perpendicular to the axis of the cutter and, during the progress of the grooving action from the tip toward the root of the cutter tooth, feeding the grooving tool inward from the side of the tooth.

2. The method of performing an edge sharpening operation on a gear shaper cutter having teeth with involute side faces and cutting edges at their ends in a plane or planes perpendicular to the axis of the cutter, which consists in locating a grinding wheel with its axis in a plane tangent to the base circle of the said involute sides, effecting relative movements of translation and rotation between the cutter and grinding wheel such that the surface element of the grinding wheel lying in said plane is caused to cross one side face of a tooth of the cutter and enter the adjacent end face of said tooth to a distance less than the width of the outer extremity of the tooth, and to cause a relative progress between the grinding wheel and tooth in the direction from the extremity toward the root of the tooth, while maintaining the intersection point of said element with said side face in a single plane of the cutter perpendicular to the axis thereof, and advancing the grinding wheel further toward the opposite side of the tooth at a stage of such progress when the grinding wheel acts on the part of the tooth of which the width is greater than the width at the extremity of the tooth.

3. The method of generating in the end, and contiguous to one side face, of a tooth of a gear generating cutter a groove of varying width forming a top rake surface intersecting the side face at an angle less than that between the side face and a plane perpendicular to the axis of the cutter, which comprises relatively locating such a cutter and a grooving tool so that the cutting part of the tool extends in a straight line at the prescribed top rake angle across one side face of a tooth of the cutter in cutting engagement with the end of the tooth and terminates short of the opposite side face of the tooth, effecting a relative rolling movement between the cutter and tool in a manner to shift the cutting action along the first mentioned side face, maintaining that part of the tool which intersects said side face always in the same plane perpendicular to the cutter axis, and effecting a relative displacement between the grooving tool and cutter along the straight line of said cutting part in the course of the grooving action in a direction such that the groove is made relatively wide in the wide part of the tooth and relatively narrow at the extremity of the tooth.

4. The method of generating in the end of a tooth of a gear generating cutter, and contiguous to one side face of such a tooth, a groove of varying width forming a top rake surface intersecting such side face at an angle smaller than that between the side face and a plane perpendicular to the axis of the cutter, which comprises relatively locating a grinding wheel, having a peripheral active surface of which the elements lying in radial planes are straight lines, and such a cutter so that the element of the grinding wheel next to the cutter extends at the prescribed top rake angle across one side face of a tooth of the cutter in cutting engagement with the end of the tooth and terminates short of the opposite side face of the tooth, rotating the grinding wheel, effecting a relative rolling movement between the cutter and wheel in a manner to shift the cutting action along the first-mentioned side face while maintaining the grinding wheel substantially normal to such face and also maintaining the intersecting point between said side face and the contiguous element of the grinding wheel always in the same plane perpendicular to the axis, and effecting a relative displacement between the grinding wheel and cutter, in the course of such relative rolling movement, along the line of the surface element of the wheel next to the cutter in directions such that the groove is made wider in the wider parts of the tooth end than at and near the extremity of the tooth.

JAMES L. WILLIAMSON.